Figure 1:
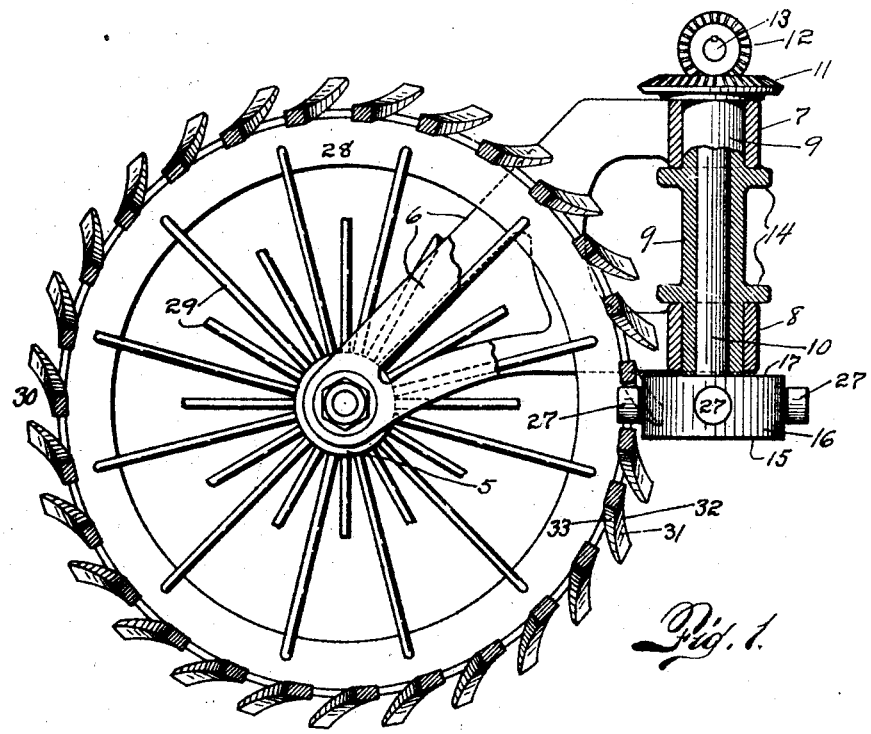

Dec. 15, 1925.

C. F. GODDARD 1,565,732

DRIVING MECHANISM

Original Filed April 8, 1920    2 Sheets-Sheet 1

Witnesses
John B. Cade

Inventor
Charles F. Goddard
by Wilkinson & Ginsta
his Attorneys

Dec. 15, 1925. 1,565,732
C. F. GODDARD
DRIVING MECHANISM
Original Filed April 8, 1920   2 Sheets-Sheet 2
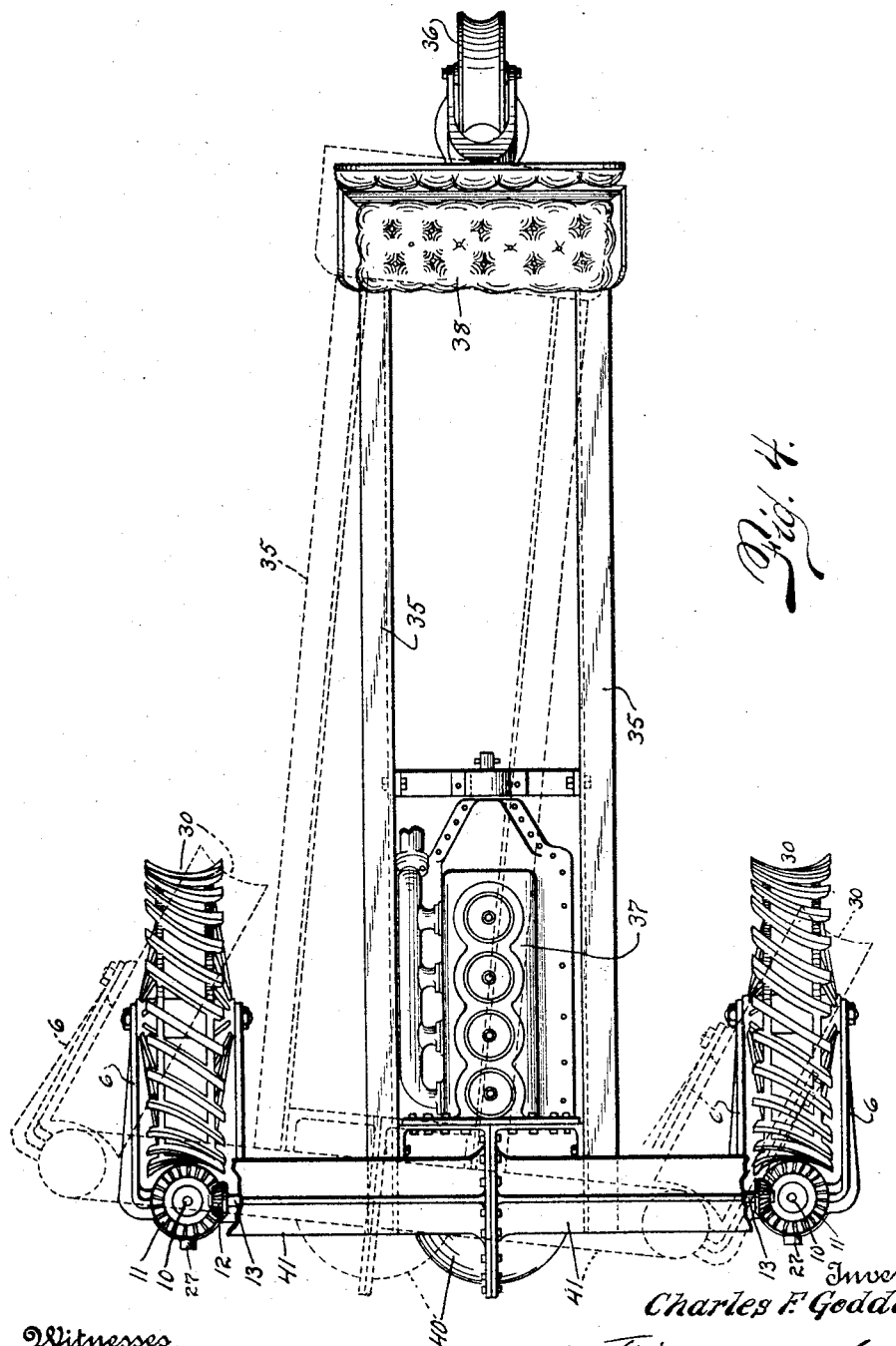

Patented Dec. 15, 1925.

1,565,732

UNITED STATES PATENT OFFICE.

CHARLES F. GODDARD, OF DENVER, COLORADO, ASSIGNOR TO THE UNION MACHINE COMPANY, OF DENVER, COLORADO, A CORPORATION OF COLORADO.

DRIVING MECHANISM.

Application filed April 8, 1920, Serial No. 372,326. Renewed January 24, 1924.

*To all whom it may concern:*

Be it known that I, CHARLES F. GODDARD, a citizen of the United States, residing at the city and county of Denver and State of Colorado, have invented certain new and useful Improvements in Driving Mechanism; and I do hereby declare the following to be a full, clear, and exact description of the invention, such as will enable others skilled in the art to which it appertains to make and use the same.

This invention broadly relates to improvements in mechanical transmission gearing.

To state, however, at least one important sphere of its commercial adaptability, by way of specific illustration and for that purpose alone, it may be said that one of the primary aims in view has been to provide an improved type of gearing, which is an entirely new departure in the art of mechanical power transmission and which is peculiarly advantageous as applied to farm power machines or other styles of tractors, especially designed for easy propulsion over fields and roads, having earthy or other yielding and undulating surfaces, as well as over roads generally of a more indurated character.

In farm tractor machines for instance, as heretofore constructed and propelled, many obstacles are presented in actual operations. Among these may be mentioned off-hand the bodily sidewise gravitation of the machine, owing to the traction wheels sliding down a decline, thus not only preventing the desired steering of a true course but also causing great lateral strains and stresses on the machine as a whole and particularly on the suspended agricultural implements plowing or working the soil. Obviously, these drawbacks likewise seriously retard the propulsion of the tractor. Also, the tractors with their suspended tools have heretofore been driven, rather than hauled by a forward drive, and furthermore, turning at the end of the field has been rendered more or less difficult and with a consequent loss of time. Such features have all proven to be so seriously objectionable that a satisfactory tractor has long been sought for, whereby these defects would be entirely eliminated.

A primary object of the present invention, especially as applied to such machines as aforesaid, is to overcome the aforementioned and other objectionable features by the employment of my novelly combined gearing, in which the driven gear means thereof embodies forwardly located endless steering or dirigible traction means, for the vehicle, and so co-acts with the driving gear means as to additionally permit of a differential steering control of the traction means, the vehicle being also provided with a trailing caster-wheel, and the said traction means, whether of wheel or tread-laying formation, being preferably so mounted as to swing or swivel around an upstanding axis disposed in the longitudinal plane or the plane of rotation of said traction means at a position distant from a vertical transverse plane through said traction means along the line of the axis around which said traction means revolves, or in other words as directly opposed to said traction means, and preferably at a position forwardly of the peripheral surface thereof, whereby the steering movements of the traction means are in the nature of caster-like motions. A further advantage in this relation may reside in the specific construction of the driven gear element's periphery, consisting of an open and substantially unobstructed tractional tread, excepting for diagonally disposed spaced bars providing spiral engaging faces for stud heads revolubly mounted radially of the driving gear element, which unique formation is extremely efficient also from the viewpoint of tractional gripping generally, in traveling over loose soil and stony surfaces, and specifically in holding to the row in traversing the ridge of a furrow.

Figure 2:
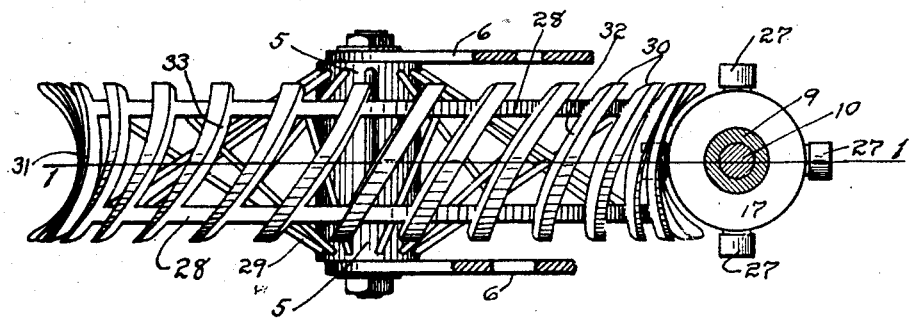
Figure 3:
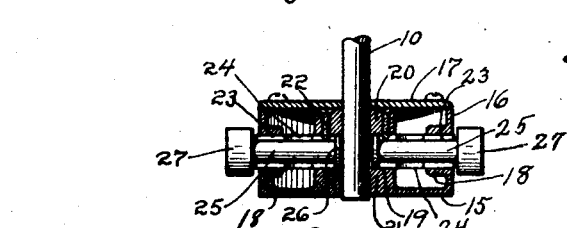

Other objects and advantages will be so clearly apparent, as incidental to the following disclosure, that it would only be undesirable surplusage to further enlarge upon the same initially. With these prefacing remarks, therefore, and for a clearer understanding of the features of novelty, as set forth more succinctly in the ensuing claims, reference will now be had immediately to the accompanying drawings, illustrating a practical embodiment of the improvements, in which drawings Figure 1 is a side elevational view of the improved gearing, the view being partly broken away and partly shown in vertical section, taken substantially in the plane of the line 1—1 of Fig. 2; Figure 2 is a top plan view thereof, with the supporting bracket for the driving gear element broken off, and the vertical driving shaft, with its housing barrel, shown in cross-section; Figure 3 is a detail vertical sectional view, through the driving gear element, taken along the line 1—1 of Fig. 2; and Figure 4 is a top plan view of a farm tractor equipped with my improvements, so coupled up as to provide a combined driving and guiding mechanism therefor, and indicating in dotted lines the bodily swing of the tractor frame, relatively to and in unison with the steering movements of the traction wheels, which is a very important feature of functioning, especially in some instances of cultivation, as will hereinafter appear.

5 designates the hub of the driven gear element, revolubly mounted between the inner ends of forked side arms 6, the outer ends of which latter provide the integrally joined upper and lower bearing sleeves 7 and 8, respectively, encompassing the reduced ends of a vertical barrel 9 housing a vertical stud driving shaft 10, which housing barrel 9 also serves as an axis element for the bearing sleeves 7 and 8, thus providing a swiveling connection, for the driven gear element, concentric with the axis of the driving gear element later referred to. In other words, the bearing sleeves 7 and 8 together with the forked arms 6 form a sub-frame so mounting the axle of the driven gear element that the latter may be swung as a bodily whole around the axis of the driving gear element.

The upper end of the shaft 10 carries a bevel gear wheel 11, driven by a bevel pinion wheel 12 carried by a main driving cross shaft 13, and the lower end of the shaft 10 carries the driving gear element of the improved gearing. The general assembly of these parts is apparent from Fig. 1, wherein the housing barrel 9 is shown with intermediate annular flange seats 14, providing a spool-shaped body section fitting between the upper and lower bearing sleeves 7 and 8, with the bevel gear wheel 11 revolubly seated on a bearing face provided at the top of the sleeve 7 and the driving gear element located underneath the sleeve 8.

Obviously, this arrangement might be modified, and likewise the specific construction of the driving gear element might also be modified; but the construction of the latter, as shown, has its certain advantages, and in detail may be formed as illustrated at Fig. 3.

In the latter view, 15 designates a lower hollow casting of the driving gear element, providing a housing having an annular wall 16 and a detachable head plate 17. The annular wall 16 is formed with a series of apertures, say four in number, opposed diametrically in pairs, and preferably comprising internally projecting radial boss bearings 18. The bottom wall 15 is formed with a central axially bored internal elongated boss, which has radial bores 19, leading from the central bore in line with the radial boss bearings 18, and thus providing an upper and a lower head section, 20 and 21 respectively, for fixedly receiving the lower end of the shaft 10, the upper head section (or the lower one for that matter) being further provided with threaded vertical apertures therethrough for receiving set screws 22.

Cylindrical bushing tubes extend between the radial bores of the center post and a complementary radial bearing boss 18. These tubes consist of two-part semi-cylindrical sections 23, which are formed at their longitudinal edges with registering recesses 24, providing lubrication inlets, and towards their inner ends they are likewise formed to provide smaller apertures for the reception of the securing ends of their complementary set screws 22. Within each of these bushing tubes is revolubly housed the shank 25 of radially disposed roller contact elements, the inner end of the shank being formed with a retaining disk-head 26 and the outer end being headed with a cylindrical tooth 27 projecting outwardly beyond the annular wall 16.

It will be obvious, therefore, that each of the radial roller engaging teeth 27 may rotate independently on its own axis while being collectively revolved in a plane at right angles substantially to the plane of rotation of the driven gear element.

Also, the assembly of this specific driving gear element is fairly apparent, the smaller end of the roller elements being simply inserted, through the respective bosses 18, with its sectional bushing tube 23 encompassing the shank 25 to retain the roller element against endwise displacement, when the bushing tube itself may be secured in place by the projection of the lower end of its complementary set screw 22 into its coacting securing aperture. Thus the housing functions additionally as a grease cup, or other lubricant container, the lubricant being distributed to the shank and its frictional parts through the inlet apertures 24.

The driven gear element may be a wheel of skeleton structure, although it need not necessarily be so in all instances, comprising the hub 5, spaced side rims or annuli 28, spokes 29, and a substantially open periphery, that is unobstructed excepting for the diagonal cross bars 30, which latter are wholly disposed, at a suitable pitch, externally of the peripheral edge faces of the annuli 28 and are spaced apart to receive the roller contacts 27 therebetween, with a wedging like drive effect but without any binding action in reverse directions of rotation. In this connection, it will be observed that these diagonal bars are desirably of concave peripheral conformation, as indicated at 31, and provide the laterally inclining roller wiping faces 32 and 33, respectively, along their reverse longitudinal side edge surfaces. It is also to be particularly noted that the formation and mounting of these bars 30, diagonally of the periphery of the driven element, are such that they are spirally disposed with relation to the axis of the driving shaft 10, as distinguished from a screw or worm element where the spirals are disposed in winding relation longitudinally along their own axis of rotation. Furthermore, where employed as a traction medium, my driven element functions additionally as a linearly advancing means relatively to its actual cyclic travel.

At Figure 4, wherein the especial utility of my improvements will appear more manifest, 35 designates generally the framework of a farm tractor, embodying the usual longitudinal and cross sills, and by my new arrangement the combined traction and guiding wheels are located at the front of the machine, with a trailer caster-wheel at the rear.

Furthermore, it will be observed that the traction wheels may be actuated by the driving gear elements in advance thereof and also that the driving gear elements revolve in a horizontal plane approximately ninety degrees distant from the tangential positions of the wheels relatively to the ground, from which positions there will be insured a maximum application of driving power with a minimum energy generated by a suitably installed engine 37.

It is not deemed to be necessary to illustrate any of the well-known controlling connections, levers and steering gear appliances, which are in convenient reach from the seat 38 for the operator.

40 simply designates the usual differential transmission casing, having lateral hollow arms 41 containing the main driving shafts 13, which hollow arms are broken away at their outer ends, omitting the housings for the bevel gearing for clearer illustration, but which hollow arms are in reality provided with hanger webs (not shown) cast integrally with the housing barrels 9, between their flange portions 14. In actuality, therefore, the tractor frame work and all of these elements are rigidly coupled together to swing laterally in unison, when changing the course of the combined traction and guiding wheels; as is clearly indicated in dotted outline, the swing being permitted by the sub-frame connections, between the tractor frame and the traction wheels, swiveling concentrically with the axis of the shaft 10.

This novel feature in itself oftentimes becomes very important, especially in certain instances of cultivation, because in tractors as heretofore designed, where the guiding is from behind, the swing of the framework in a rearwardly located arc will be transversely counter to the deviated course, and hence the suspended agricultural implement will be initially directed towards, and operated right in the zone of, the plant life being cultivated, immediately upon the course of the tractor being but even slightly diverted for the very purpose of attempting to avoid the uprooting of the plants. By my arrangement, however, the exact reverse is true, in that the swing of the framework is in a forwardly located arc, transversely conformable with the swiveling of the guiding traction wheels, so that the implement will be instantly guided away from the plant zone, thus providing for a complete clearance, when the danger of uprooting the plants is entirely eliminated.

Furthermore, the concave formation and the relatively open spaced arrangement of the diagonally disposed traction bars 30 provide for such a positive biting into the soil, although with perfect freedom as to tractional movement, that the wheels will hold firmly to the ridges, between rows, which they may be traversing longitudinally, whether directly upon the apices thereof or traveling along either of their sloping sides. Hence any bodily sidewise gravitation of the tractor is avoided by preventing the slipping of its wheels down the sloping sides of the ridges, which would naturally cause the uprooting or destruction of the plants, for instance in the cultivation of listed corn.

From the foregoing description, it is believed that the many advantages of my improvements will be apparent and especially as employed with tractors, but there might be additionally mentioned many other analogous fields in which features of the improvements could be very satisfactorily employed, and without departing from the broader principles of the invention, including for instance various types of tread-laying machines, continuously operated endless platforms and conveyors, internal gearing as well as external gearing, revolving drums, differential drive equipment for motor trucks or analogous vehicles, casings and revoluble bodies generally equipped with gearing, and indeed in numerous and varied other relations.

Referring now to the specific operation of the improved gearing itself, it is believed that this will have been fairly apparent from the drawings and the foregoing description, but it may be further said that, during forward propulsion, the rotation of the shaft 10 causes the roller teeth 27, of the driving gear element, to ride on the upper faces 32 of each successive diagonal bar of the driven gear element, rolling thereover with a downwardly wedging-like action. In the reverse direction of propulsion, which will naturally be occasioned in instances of backing up, it will likewise be obvious that the roller teeth 27 will roll along the underneath faces 33 of the diagonal bars, with an upwardly wedging-like action. However, the travel of the rollers between each pair of diagonal bars is with full freedom against binding in either direction, so that if the transmission gears, of the main driving mechanism, were thrown out of clutch, as for instance when going down grades in running a tractor over roads, the rotation of the traction wheels would not be materially braked by the driving gear element, as would be the case with an ordinary worm gearing mechanism.

While I have now made a complete disclosure of the invention, with reference to both generic and specific applications thereof, it may be found later to be desirable or expedient to make alterations or substitutions in the form and structural arrangement of elements, but without departing from the spirit of the invention, and it will be understood, therefore, that I do not limit myself necessarily to the exact details as shown and described, excepting as they may come within the terms of the ensuing claims, or as when fairly interpreted in the light of the specification, if necessary, and understood equivalents.

What I do claim, as new and patentable is:—

1. In driving mechanism, the combination of a movably supported element providing a substantially open endless zone encompassed by a continuous series of spaced cross bars wholly located exteriorly of said open zone and having diagonally disposed engaging faces, and a second movably supported element providing a continuous series of separately projected roller members so associated with said cross bars as to successively ride longitudinally along a complementary diagonal face thereof with a propelling action.

2. In driving mechanism, the combination of a movably supported element providing a substantially open endless zone with a continuous series of spaced cross bars wholly located exteriorly of said open zone and having diagonally disposed engaging faces, and a revolubly supported element providing a continuous series of separately projected members which are all radially disposed in the same plane and are so associated with said cross bars as to successively ride longitudinally along a complementary diagonal face thereof with a propelling action.

3. In driving mechanism, the combination of a movably supported element providing an endless zone with a continuous series of spaced cross bars having diagonally disposed engaging side edge faces and a concave outer longitudinal face coextensive therewith, and a revolubly supported cylindrical element providing a series of projected members so associated with said cross bars as to successively ride along the full length of a complemental diagonal face thereof with a propelling force, the side edge faces and concave face of each of said cross bars being all so disposed spirally, relatively to the axis of said cylindrical element during their travel past the zone thereof, that if extended they would spirally encompass said axis.

4. In driving mechanism, the combination of a movably supported element providing an endless zone with a continuous series of spaced cross bars having diagonally disposed engaging side edge faces and a concave outer longitudinal face coextensive therewith, and a revolubly supported cylindrical element providing a continuous series of members which are all separately projected in the same plane and are so associated with said cross bars as to successively ride along the full length of a complementary diagonal face thereof with a propelling action, the side edge faces and concave face of each of said cross bars being all so disposed, relatively to the axis of said cylindrical element during their travel past the zone thereof, that if extended they would spirally encompass said axis.

5. In driving mechanism, the combination of a movably supported element providing an endless zone with a continuous series of spaced cross bars having diagonally disposed engaging side edge faces and a concave outer longitudinal face coextensive therewith, and a revolubly supported cylindrical element providing a continuous series of roller members which are all separately projected in the same plane and are so associated with said cross bars as to successively ride along the full length of a complementary diagonal face thereof with a propelling action, the side edge faces and concave face of each of said cross bars being all so disposed, relatively to the axis of said cylindrical element during their travel past the zone thereof, that if extended they would spirally encompass said axis.

6. In driving mechanism, the combination of a movably supported element providing an endless zone with a continuous series of spaced cross bars having diagonally disposed engaging faces, a revolubly mounted element providing a series of projected members so associated with said cross bars as to successively ride along a complementary diagonal face thereof with a propelling action, and connections leading from the support of said movably supported element, which connections are pivotally mounted to swivel around the axis of said revolubly mounted element.

7. In driving mechanism, the combination of a movably supported element providing an endless zone with a continuous series of spaced cross bars having diagonally disposed engaging faces, a revolubly mounted element providing a series of projected members so associated with said cross bars as to successively ride along a complementary diagonal face thereof with a propelling action, the said spaced cross bars being so formed and arranged as to be spirally disposed relatively to the axis of said revolubly mounted element during their travel past the zone of the latter, and connections leading from the support of said movably supported element, which connections are pivotally mounted to swivel around the axis of said revolubly mounted element.

8. In driving mechanism, the combination of a wheel, the periphery of which provides a continuous series of spaced cross bars having diagonally disposed engaging faces, and a revolubly mounted element providing a series of projected members so associated with said cross bars as to successively ride along a complementary diagonal face thereof with a propelling action, the said spaced cross bars being so formed and arranged as to be spirally disposed relatively to the axis of said revolubly mounted element during their travel past the zone of the latter.

9. In driving mechanism, the combination of a wheel, the periphery of which provides a continuous series of spaced cross bars having diagonally disposed engaging faces, a revolubly mounted element providing a series of projected members so associated with said cross bars as to successively ride along a complementary diagonal face thereof, and connections leading from the axis of said wheel which are pivotally mounted to swivel around the axis of said revolubly mounted element.

10. In driving mechanism, the combination of a wheel, the periphery of which provides a continuous series of spaced cross bars having diagonally disposed engaging faces, a revolubly mounted element providing a series of projected members so associated with said cross bars as to successively ride along a complementary diagonal face thereof with a propelling action, the spaced cross bars being so formed and arranged as to be spirally disposed relatively to the axis of said revolubly mounted element during their travel past the zone of the latter, and connections leading from the axis of said wheel which are pivotally mounted to swivel around the axis of said revolubly mounted element.

11. In tractor driving mechanism, the combination of an endless traction element which embodies a tread providing a continuous series of spaced traction cross bars having diagonally disposed engaging faces, a revolubly supported element providing a series of projected members so associated with said cross bars as to successively ride along a complementary diagonal face thereof with a propelling action, and suitable gearing connections for said revolubly supported element.

12. In tractor driving mechanism, the combination of an endless traction element which embodies a tread providing a continuous series of spaced traction cross bars having diagonally disposed engaging faces, a revolubly mounted element providing a series of projections so associated with said cross bars as to successively ride along a complementary diagonal face thereof with a propelling action, the said traction cross bars being so formed and arranged as to be spirally disposed relatively to the axis of said revolubly mounted element during their travel past the zone of the latter, and suitable gearing connections for said revolubly mounted element.

13. In tractor driving mechanism, the combination of an endless traction element which embodies a tread providing a continuous series of spaced traction cross bars having diagonally disposed engaging faces, a revolubly mounted element providing a series of projections so associated with said traction cross bars as to successively ride along a complementary diagonal face thereof with a propelling action, the said traction cross bars being so formed and arranged as to be spirally disposed relatively to the axis of said revolubly mounted element during their travel past the zone of the latter, connections leading from the support of said endless traction element which are pivotally mounted to swing around the axis of said revolubly mounted element, and suitable gearing connections for said revolubly mounted element.

14. In tractor driving mechanism, the combination of a wheel, the periphery of which provides a tread embodying a continuous series of spaced traction cross bars having diagonally disposed engaging faces, a revolubly mounted element providing a series of projected members so associated with said traction cross bars as to successively ride along a complementary diagonal face thereof with a propelling action, and suitable gearing connections for said revolubly mounted element.

15. In tractor driving mechanism, the combination of a wheel, the periphery of which provides a tread embodying a continuous series of spaced traction cross bars having diagonally disposed engaging faces, a revolubly mounted element providing a series of projected members so associated with said traction cross bars as to successively ride along a complementary diagonal face thereof with a propelling action, the said traction cross bars being so formed and arranged as to be spirally disposed relatively to the axis of said revolubly mounted element during their travel past the zone of the latter, and suitable gearing connections for said revolubly mounted element.

16. In tractor driving mechanism, the combination of a wheel, the periphery of which provides a tread embodying a continuous series of spaced traction cross bars having diagonally disposed engaging faces, a revolubly mounted element providing a series of projected members so associated with said traction cross bars as to successively ride along a complementary diagonal face thereof with a propelling action, the said traction cross bars being so formed and arranged as to be spirally disposed relatively to the axis of said revolubly mounted element during their travel past the zone of the latter, connections leading from the axis of said wheel which are pivotally mounted to swing around the axis of said revolubly mounted element, and suitable gearing connections for said revolubly mounted element.

17. In tractor driving mechanism, the combination of a wheel, embodying a substantially open periphery encompassed by a continuous series of spaced tread forming traction cross bars having diagonally disposed engaging faces, a revolubly mounted element providing a series of projections so associated with said traction bars as to successively ride along a complementary diagonal face thereof with a propelling action, and suitable gearing connections for said revolubly mounted element.

18. In tractor driving mechanism, the combination of a wheel which embodies a substantially open periphery encompassed by a continuous series of tread forming spaced traction cross bars having diagonally disposed engaging faces, a revolubly mounted element providing a series of projected members so associated with said traction cross bars as to successively ride along a complementary diagonal face thereof with a propelling action, the said traction cross bars being so formed and arranged as to be spirally disposed relatively to the axis of said revolubly mounted element during their travel past the zone of the latter, and suitable gearing connections for said revolubly mounted element.

19. In tractor driving mechanism, the combination of a wheel which embodies a substantially open periphery encompassed by a continuous series of tread forming spaced traction cross bars having diagonally disposed engaging faces, a revolubly mounted element providing a series of projected members so associated with said traction cross bars as to successively ride along a complementary diagonal face thereof with a propelling action, the said traction cross bars being so formed and arranged as to be spirally disposed relatively to the axis of said revolubly mounted element during their travel past the zone of the latter, connections leading from the axis of said wheel which are pivotally mounted to swivel around the axis of said revolubly mounted element, and suitable shafting connected with said revolubly mounted element.

20. In tractor driving mechanism, the combination of a pair of endless traction elements, each of which embodies a tread providing a continuous series of spaced traction cross bars having diagonally disposed engaging faces; and a pair of revolubly supported elements, each providing a continuous series of radially disposed roller contact members so associated and co-acting with their respective series of cross bars as to successively ride along a complementary diagonal face thereof with a propelling action.

21. In tractor driving mechanism, the combination of a pair of endless traction elements, each of which embodies a tread providing a substantially open endless zone encompassed by a continuous series of spaced traction cross bars having diagonally disposed engaging faces; and a pair of revolubly supported elements, each providing a continuous series of radially disposed contact members so associated and co-acting with their respective series of cross bars as to successively ride along a complementary diagonal face thereof with a propelling action.

22. In tractor driving mechanism, the combination of a pair of endless traction elements, each of which embodies a tread providing a substantially open endless zone encompassed by a continuous series of spaced traction cross bars having diagonally disposed engaging faces; and a pair of revolubly supported elements, each providing a continuous series of radially disposed roller contact members so associated and co-acting with their respective series of cross bars as to successively ride along a complementary diagonal face thereof with a propelling action.

23. In tractor driving mechanism, the combination of a pair of supporting traction wheels, each providing an endless zone with a continuous series of spaced cross bars having diagonally disposed engaging faces; a pair of revolubly supported elements, each providing a continuous series of radially disposed roller contact members so associated and co-acting with their respective series of cross bars as to successively ride along a complementary diagonal face thereof; and suitably operated and connected driving means for said revolubly supported elements.

24. In tractor driving mechanism, the combination of a pair of supporting traction wheels, each of which embodies a substantially open periphery encompassed by a continuous series of spaced cross bars having diagonally disposed engaging faces; a pair of revolubly supported elements, each providing a continuous series of radially disposed contact members so associated and coacting with their respective series of cross bars as to successively ride along a complementary diagonal face thereof; and suitably operated and connected driving means for said revolubly supported elements.

25. In tractor driving mechanism, the combination of a pair of supporting traction wheels, each providing a substantially open periphery encompassed by a continuous series of spaced cross bars having diagonally disposed engaging faces; a pair of revolubly supported elements, each providing a continuous series of radially disposed roller contact members so associated and coacting with their respective series of cross bars as to successively ride along a complementary diagonal face thereof; and suitably operated and connected driving means for said revolubly supported elements.

26. Vehicle driving mechanism including an endless dirigible traction element mounted to laterally swivel on an upstanding axis that is disposed in the plane of rotation of said traction element at a position distant from a vertical transverse plane through said traction element along the line of the axis around which said traction element revolves.

27. Vehicle driving mechanism including an endless dirigible traction element mounted to swivel laterally on an upstanding axis that is disposed in the plane of rotation of said traction element at a position forwardly of the peripheral surface of said traction element.

28. Vehicle driving mechanism including a dirigible endless traction element, an upstanding shaft carried by the main frame of the vehicle and disposed in the plane of rotation of said traction element, and a sub-frame connecting said traction element with said upstanding shaft, the said sub-frame being so pivotally connected to said upstanding shaft as to permit of the lateral swiveling of said sub-frame on said upstanding shaft.

29. Vehicle driving mechanism including a dirigible traction wheel, an upstanding shaft carried by the main frame of the vehicle and disposed in the plane of rotation of said wheel at a position directly opposed to the peripheral tread surface of said wheel, and a sub-frame connecting said upstanding shaft with the axle of said wheel, the said sub-frame being so pivotally connected to said upstanding shaft as to permit of the lateral swiveling of said sub-frame on said upstanding shaft.

30. Vehicle driving mechanism including a dirigible traction wheel, an upstanding axis carried by the main frame of the vehicle and disposed in the plane of rotation of said wheel at a position forwardly of the peripheral surface of said wheel, and a sub-frame connecting said upstanding shaft with the axle of said wheel, the said sub-frame being so pivotally connected to said upstanding axis as to permit of the lateral swiveling of said sub-frame on said upstanding axis.

In testimony whereof, I affix my signature.

CHARLES F. GODDARD.